(12) United States Patent
Potter et al.

(10) Patent No.: US 10,293,593 B2
(45) Date of Patent: *May 21, 2019

(54) FORMING A THREE DIMENSIONAL OBJECT (71) Applicant: BAE Systems plc, London (GB)

(72) Inventors: Mark Alfred Potter, Preston (GB); Matthew Nicholas Stevens, Preston (GB)

(73) Assignee: BAE SYSTEMS PLC, London (GB)

( * ) Notice: Subject to any disclaimer, the term of this patent is extended or adjusted under 35 U.S.C. 154(b) by 289 days.

This patent is subject to a terminal disclaimer.

(21) Appl. No.: 15/124,187

(22) PCT Filed: Mar. 11, 2015

(86) PCT No.: PCT/GB2015/050706
§ 371 (c)(1),
(2) Date: Sep. 7, 2016

(87) PCT Pub. No.: WO2015/136277
PCT Pub. Date: Sep. 17, 2015

(65) Prior Publication Data
US 2017/0015065 A1    Jan. 19, 2017

(30) Foreign Application Priority Data

Mar. 11, 2014 (EP) ..................... 14275051
Mar. 11, 2014 (GB) ................... 1404247.7

(51) Int. Cl.
*B29C 67/00* (2017.01)
*H05B 6/00* (2006.01)
(Continued)

(52) U.S. Cl.
CPC ............ *B33Y 50/02* (2014.12); *B29C 64/153* (2017.08); *B29C 64/165* (2017.08);
(Continued)

(58) Field of Classification Search
CPC ... B33Y 10/00; B29C 64/153; B29C 67/0081; B29C 67/04; B29C 67/0077
See application file for complete search history.

(56) References Cited

U.S. PATENT DOCUMENTS 7,708,929 B2 * 5/2010 Monsheimer ....... B29C 67/0077
264/460
2004/0232583 A1  11/2004 Monsheimer et al.
(Continued)

FOREIGN PATENT DOCUMENTS

CN      103426498 A    12/2013
DE  102007024469 A1    11/2008
(Continued)

OTHER PUBLICATIONS

Extended European Search Report dated Jul. 9, 2014 of Application EP14275050.4, 8 pages.
(Continued)

*Primary Examiner* — Michael P Wieczorek
(74) *Attorney, Agent, or Firm* — Maine Cernota & Rardin (57) ABSTRACT

Disclosed are methods and apparatus for selectively sintering particulate material, the method comprising: providing a layer (6) of particulate material; providing an amount of a radiation absorbent material over a selected surface portion of the layer (6) of particulate material; providing an amount of a material that comprises a plurality of electrically conductive elements (20) over at least part of the selected surface portion of the layer (6) of particulate material; and providing radiation (8) across the selected surface portion of the layer of particulate material so as to sinter a portion of the material of the layer (6) including causing the plurality of electrically conductive elements (20) to become embedded in the sintered portion of material.

9 Claims, 2 Drawing Sheets (51) Int. Cl.
  *B33Y 50/02*   (2015.01)
  *B29C 70/62*   (2006.01)
  *B29C 70/88*   (2006.01)
  *B29C 70/14*   (2006.01)
  *B33Y 10/00*   (2015.01)
  *B33Y 30/00*   (2015.01)
  *B33Y 80/00*   (2015.01)
  *B29C 64/153*  (2017.01)
  *B29C 64/165*  (2017.01)
  *B29C 64/386*  (2017.01)
  B29K 105/00        (2006.01)
  B29K 105/16        (2006.01)
  B29K 105/18        (2006.01)
  B29K 507/04        (2006.01)

(52) U.S. Cl.
  CPC ............ *B29C 64/386* (2017.08); *B29C 70/14* (2013.01); *B29C 70/62* (2013.01); *B29C 70/882* (2013.01); *B33Y 10/00* (2014.12); *B33Y 30/00* (2014.12); *B33Y 80/00* (2014.12); *B29K 2105/0005* (2013.01); *B29K 2105/0073* (2013.01); *B29K 2105/167* (2013.01); *B29K 2105/18* (2013.01); *B29K 2105/251* (2013.01); *B29K 2507/04* (2013.01); *B29K 2995/0005* (2013.01)

(56) References Cited

U.S. PATENT DOCUMENTS

| | | | |
|---|---|---|---|
| 2007/0183918 A1 | 8/2007 | Monsheimer | |
| 2007/0238056 A1 | 10/2007 | Baumann et al. | |
| 2009/0017220 A1 | 1/2009 | Muller et al. | |
| 2009/0261287 A1 | 10/2009 | Withey | |
| 2014/0268607 A1* | 9/2014 | Wicker | H05K 1/0284 361/761 |
| 2017/0015064 A1* | 1/2017 | Potter | B29C 70/62 |

FOREIGN PATENT DOCUMENTS

| | | |
|---|---|---|
| EP | 0705682 A1 | 4/1996 |
| EP | 1648686 A1 | 4/2006 |
| EP | 2565022 A1 | 3/2013 |
| EP | 1648686 B2 | 6/2015 |
| GB | 2422344 A | 7/2006 |
| GB | 2493398 A | 2/2013 |
| WO | 2005011959 A1 | 2/2005 |
| WO | 2007114895 A2 | 10/2007 |
| WO | 2015130401 A3 | 9/2015 |

OTHER PUBLICATIONS

Search Report under Section 17(5) dated Sep. 9, 2014 of Application GB1404246.9, 4 pages.
Combined Search and Examination Report under Section 17 and 18(3) dated Sep. 30, 2015 of Application GB1504080.1, 8 pages.
International Search Report and Written Opinion of the International Searching Authority dated May 13, 2015 of Application PCT/GB2015/050707, 13 pages.
International Preliminary Report on Patentability dated Jun. 23, 2016 of Application PCT/GB2015/050707, 16 pages.
Extended European Search Report dated Jul. 9, 2014 of Application EP14275051, 8 pages.
Search Report under Section 17(5) dated Sep. 9, 2014 of Application GB1404247.7, 5 pages.
Combined Search and Examination Report under Section 17 and 18(3) dated Sep. 30, 2015 of Application GB1504079.3, 8 pages.
International Preliminary Report on Patentability dated May 24, 2016 of Application PCT/GB2015/050706, 18 pages.
International Search Report and Written Opinion dated May 12, 2015 of Application PCT/GB2015/050706, 12 pages.

* cited by examiner

FORMING A THREE DIMENSIONAL OBJECT

RELATED APPLICATIONS

This application is a national phase application filed under 35 USC § 371 of PCT Application No. PCT/GB2015/050706 with an International filing date of 11 Mar. 2015 which claims priority of GB Patent Application 1404247.7 filed 11 Mar. 2014 and EP Patent Application 14275051.2, filed 11 Mar. 2014. Each of these applications is herein incorporated by reference in their entirety for all purposes.

FIELD OF THE INVENTION

The present invention relates to forming three dimensional objects.

BACKGROUND

Additive Manufacturing (AM) (also known as Additive Layer Manufacture (ALM), 3D printing, etc.) is a process that may be used to produce functional, complex objects, layer by layer, without moulds or dies. Typically, such processes include providing material (e.g. metal or plastic) in the form of a powder or a wire, and, using a powerful heat source such as a laser beam, electron beam or an electric, or plasma welding arc, melting an amount of that material and depositing the melted material (e.g. on a base plate of a work piece). Subsequent layers are then built up upon each preceding layer.

A number of AM methods are currently available including, but are not limited to, Laser Blown Powder, Laser Powder Bed, and Wire and Arc technologies.

EP 1 648 686 (Loughborough University Enterprises Ltd.) discloses an AM method in which a layer of particulate material is provided, an amount of radiation absorbing material is provided over a selected portion of the provided layer of particulate material, and radiation is provided across the selected portion to sinter the particulate material of the selected portion. This process is then repeated to form a three-dimensional object.

SUMMARY OF THE INVENTION

In a first aspect, the present invention provides a method of forming a three dimensional object. The method comprises iteratively performing steps (i) to (iv) so as to form the three dimensional object comprising an electrically conductive track through at least part of the object, the electrically conductive track being defined by electrically conductive elements embedded within the object. Step (i) comprises providing a layer of particulate material. Step (ii) comprises providing an amount of a radiation absorbent material over a selected surface portion of the layer of particulate material. Step (iii) comprises providing an amount of a material that comprises a plurality of electrically conductive elements over only part of the selected surface portion of the layer of particulate material. Step (iv) comprises providing radiation across the selected surface portion of the layer of particulate material so as to sinter a portion of the material of the layer including causing the plurality of electrically conductive elements to become embedded in the portion of material and to sinter the portion of material with a previously sintered portion of the material in a prior layer.

Preferably, the particulate material is relatively electrically resistive compared to the electrically conductive elements. However, in some aspects the particulate material is electrically conductive, and the electrically conductive track may be surrounded by an electrically resistive region.

The electrically conductive elements may be elongate elements, for example, selected from the group of elements consisting of carbon nanotubes and elongate graphene plates. Providing the elongate electrically conductive elements over at least part of the selected surface portion of the layer of particulate material may comprise ejecting (e.g. in a carrier fluid), from a printing device, the elongate elements as the printing device moves over the selected surface portion of the layer of particulate material. Thus, the elongate electrically conductive elements tend to be aligned, for example, along a direction of travel of the printing device. The printing device may be operated so as to align the electrically conductive elements along the electrically conductive track.

The method may further comprise, in at least one iteration of steps (i) to (iv), applying a force or field (e.g. an electric or magnetic field) to the deposited electrically conductive elements, thereby causing the deposited electrically conductive elements to substantially align. The force or field may be applied so as to align the electrically conductive elements along the electrically conductive track.

The electrically conductive elements in a first layer may be aligned in a different direction to the electrically conductive elements in a second layer, the first layer being different to the second layer.

The electrically conductive elements may be made of metal.

The radiation absorbent material and the plurality of electrically conductive elements may be provided together in a compound that comprises both the radiation absorbent material and the plurality of electrically conductive elements. The compound may be a liquid comprising a solvent. The radiation absorbent material and the plurality of electrically conductive elements may be dispersed throughout the solvent.

The radiation absorbent material and the electrically conductive elements may be the same material.

The method may further comprise, prior to providing radiation across the selected surface portion of the layer of particulate material, providing an amount of a material that comprises a plurality of elongate elements (such as glass fibres) over at least part of the selected surface portion of the layer of particulate material; and sintering the portion of the material of the layer causes the plurality of elongate elements to become embedded in the sintered portion of material.

The material that comprises the electrically conductive elements may be applied over at least part of the prior layer in which electrically conductive elements are embedded such that, after sintering, an electrically conductive path between the current layer and the prior layer is provided. The material that comprises the electrically conductive elements may be applied over only part of the selected surface portion of the layer of particulate material so that, after sintering, an electrically conductive track between one point within the sintered layer and a different point within the sintered layer is provided.

In at least one iteration, the step of providing an amount of a material that comprises a plurality of electrically conductive elements may comprise: providing a first amount of the material that comprises a plurality of electrically conductive elements on a first area of the selected surface portion of the layer of particulate material, and providing a second amount of the material that comprises a plurality of electrically conductive elements on a second area of the selected surface portion of the layer of particulate material, the second amount being different to the first amount.

In at least one iteration, the material that comprises the electrically conductive elements may be applied over at least part of the prior layer in which electrically conductive elements are embedded such that, after sintering, an electrically conductive path between the current layer and the prior layer is provided.

In a further aspect, the present invention provides apparatus for forming a three dimensional object. The apparatus comprises one or more printing devices and a radiation source. The one or more printing devices and the radiation source are operable to iteratively perform steps (i) to (iv) so as to form the three dimensional object. Step (i) comprises providing, by the one or more printing devices, a layer of particulate material. Step (ii) comprises providing, by the one or more printing devices, an amount of a radiation absorbent material over a selected surface portion of the layer of particulate material. Step (iii) comprises providing, by the one or more printing devices, an amount of a material that comprises a plurality of electrically conductive elements over at least part of the selected surface portion of the layer of particulate material. Step (iv) comprises providing, by the radiation source, radiation across the selected surface portion of the layer of particulate material so as to sinter a portion of the material of the layer including causing the plurality of electrically conductive elements to become embedded in the portion of material and to sinter the portion of material with a previously sintered portion of the material in a prior layer. In step (iii), the material that comprises the electrically conductive elements is selectively provided over only part of the selected surface portion of the layer of particulate material so as to define an electrically conductive track through at least part of the three dimensional object.

In a further aspect, the present invention provides a method of selectively sintering particulate material, the method comprising: providing a layer of particulate material; providing an amount of a radiation absorbent material over a selected surface portion of the layer of particulate material; providing an amount of a material that comprises a plurality of electrically conductive elements over at least part of the selected surface portion of the layer of particulate material; and providing radiation across the selected surface portion of the layer of particulate material so as to sinter a portion of the material of the layer including causing the plurality of electrically conductive elements to become embedded in the sintered portion of material.

Providing the radiation absorbent material may include depositing or applying the radiation absorbent material (e.g. as a layer of radiation absorbent material) onto the surface of the layer of particulate material.

Providing the material that comprises the elongate elements may include depositing or applying the elongate elements (e.g. as a layer of material) onto the surface of the layer of particulate material.

The electrically conductive elements may be carbon nanotubes.

The electrically conductive elements are elements having diameters less than 150 nm.

The electrically conductive elements may be made of metal (e.g. copper).

The radiation absorbent material and the plurality of electrically conductive elements may be provided together in a compound that comprises both the radiation absorbent material and the plurality of electrically conductive elements.

The compound may be a liquid that may be "jetted" onto the surface of the particulate material. The compound may comprise a solvent. The radiation absorbent material and the plurality of electrically conductive elements may be dispersed throughout the solvent.

The method may further comprise performing the following steps (i) to (iv) one or more times so as to form a three dimensional object. Step (i) may include providing a further layer of particulate material overlying the prior layer of particulate material including the previously sintered portion of material. Step (ii) may include providing an amount of the radiation absorbent material over a selected surface portion of the further layer of particulate material. Step (iii) may include providing an amount of the material that comprises a plurality of electrically conductive elements over at least part of the selected surface portion of the further layer of particulate material. Step (iv) may include providing radiation across the selected surface portion of the further layer of particulate material so as to sinter a further portion of the material including causing the plurality of electrically conductive elements to become embedded in the sintered further portion and to sinter the further portion with the previously sintered portion of the material in the prior layer.

Step (iii) may be performed such that the material that comprises the electrically conductive elements is applied over at least part of the prior layer in which electrically conductive elements are embedded. Thus, after sintering, an electrically conductive path between the current layer and the prior layer is provided.

The step of providing an amount of a material that comprises a plurality of electrically conductive elements may comprise providing a first level of the material that comprises a plurality of electrically conductive elements on a first area of the selected surface portion of the layer of particulate material, and providing a second level of the material that comprises a plurality of electrically conductive elements on a second area of the selected surface portion of the layer of particulate material, the second level being different to the first level.

The step of providing an amount of a material that comprises a plurality of electrically conductive elements over at least part of the selected surface portion of the layer of particulate material may comprise providing the amount of a material that comprises a plurality of electrically conductive elements over only part of the selected surface portion of the layer of particulate material so that, after sintering, an electrically conductive track between one point within the sintered layer and a different point within the sintered layer is provided.

The radiation absorbent material and the electrically conductive elements may be the same material.

The electrically conductive elements may also be thermally conductive elements.

The method may further comprise, prior to providing radiation across the selected surface portion of the layer of particulate material, providing an amount of a material that comprises a plurality of elongate elements over at least part of the selected surface portion of the layer of particulate material, and sintering the portion of the material of the layer causes the plurality of elongate elements to become embedded in the sintered portion of material.

In a further aspect, the present invention provides a method of selectively sintering particulate material, the method comprising: providing a layer of particulate material; providing an amount of a radiation absorbent material over a selected surface portion of the layer of particulate material; providing an amount of a material that comprises a plurality of thermally conductive elements over at least part of the selected surface portion of the layer of particulate material; and providing radiation across the selected surface portion of the layer of particulate material so as to sinter a portion of the material of the layer including causing the plurality of thermally conductive elements to become embedded in the sintered portion of material.

The thermally conductive elements may also be electrically conductive elements.

In a further aspect the present invention provides a three dimensional object formed using a method according to any of the above aspects.

In a further aspect the present invention provides apparatus for selectively sintering particulate material, the apparatus comprising one or more printing devices configured to provide an amount of a radiation absorbent material over a selected surface portion of a provided layer of particulate material, and provide an amount of a material that comprises a plurality of electrically conductive elements over at least part of the selected surface portion of the layer of particulate material. The apparatus further comprises a radiation source operable to provide radiation across the selected surface portion of the layer of particulate material so as to sinter a portion of the material of the layer including causing the plurality of electrically conductive elements to become embedded in the sintered portion of material.

In a further aspect the present invention provides a compound for use in a process of selectively sintering particulate material, the compound comprising a radiation absorbent material, and a plurality of electrically conductive elements.

The compound may be a liquid. The compound may further comprise a solvent. The radiation absorbent material and the plurality of electrically conductive elements may be dispersed throughout the solvent.

In a further aspect the present invention provides a compound for use in a process of selectively sintering particulate material, the compound comprising a radiation absorbent material, and a plurality of electrically insulating elements.

DETAILED DESCRIPTION

The terminology "Additive Manufacturing" is used herein to refer to all additive processes that may be used to produce functional, complex objects, layer by layer, without moulds or dies e.g. by providing material (e.g. metal or plastic) typically in the form of a powder or a wire, and, using a powerful heat source such as a laser beam, electron beam or an electric, or plasma welding arc, melting an amount of that material and depositing the melted material (e.g. on a base plate/work piece), and subsequently building layers of material upon each preceding layer.

Additive Manufacture (AM) may also be known inter alia as 3D printing, Direct Digital Manufacturing (DDM), Digital Manufacturing (DM), Additive Layer Manufacturing (ALM), Rapid Manufacturing (RM), Laser Engineering Net Shaping (LENS), Direct Metal Deposition, Direct Manufacturing, Electron Beam Melting, Laser Melting, Freeform Fabrication, Laser Cladding, Direct Metal Laser Sintering, Selective Laser Melting, Fused Deposition Modelling, and High Speed Sintering.

Figure 1:
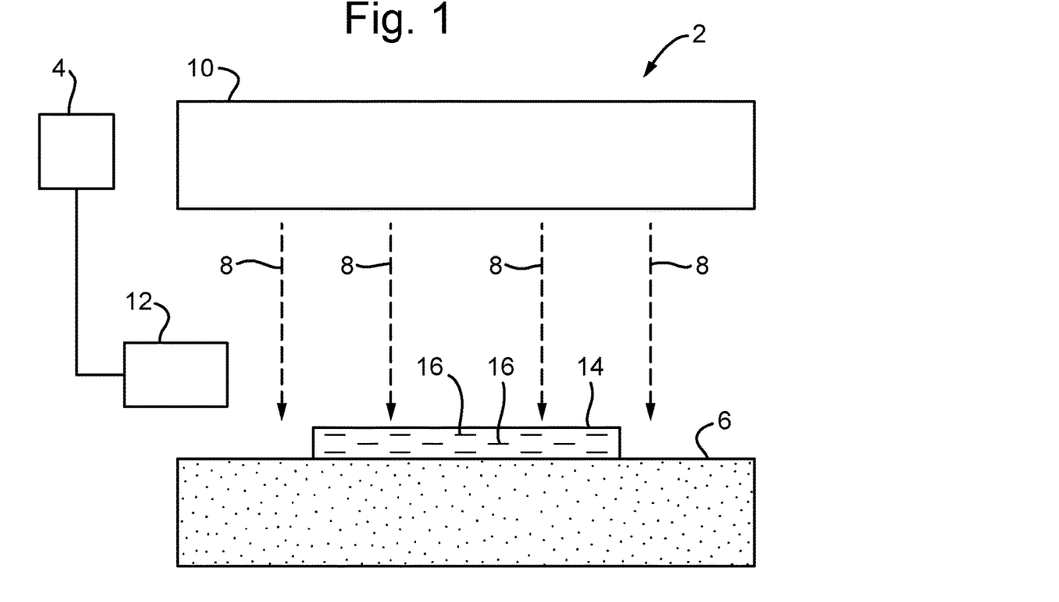
FIG. 1 is a schematic illustration (not to scale) of an apparatus for combining particulate material according to an embodiment.

FIG. 1 is a schematic illustration (not to scale) showing example Additive Manufacturing apparatus 2 that is used in an embodiment of a process of producing an object. The apparatus 2 comprises a controller 4 for enabling the exposure of a surface portion of a layer 6 of particulate material to radiation 8 provided by a radiation source 10.

In this embodiment, the particulate material is a plastic in powder form. However, in other embodiments, the particulate material may be a different material such as a metal or ceramic. In this embodiment, the radiation 8 is infrared radiation. However, in other embodiments, radiation other than infrared radiation may be used. The radiation source 10 may be any appropriate source such as halogen lighting or a scanning laser.

In this embodiment, the controller 4 is configured to control the variation of radiation absorption across the surface portion of the layer 6 of particulate material. In particular, the controller controls a printing head 12 to deposit desired amounts of a first compound 14 onto the surface portion of the layer 6. The movement of the printing head 12 and the amount of first compound 14 deposited by the printing head 12 is controlled by the controller 4.

In some embodiments, a temperature sensor or an infrared camera, or the like may be used to determine the surface temperature of the layer 6. The amount of the first compound 14 that is to be deposited onto the surface portion of the layer 6 may be determined by the controller 4 depending on the determined temperature.

In this embodiment, the first compound 14 is in liquid form and is jetted onto the surface of the layer 6 by the printing head 12.

Advantageously, the jetting or ejection of the first compound onto the layer 6 as the printing head moves across the surface of the layer 6 advantageously tends to cause the carbon nanotubes 16 to align.

In this embodiment, the first compound 14 comprises a solvent in which is dispersed a radiation absorbent material and a plurality of carbon nanotubes 16. The solvent may be any appropriate solvent for example an aqueous medium that evaporates when exposed to the radiation 8 emitted from the radiation source 10.

The radiation absorbent material is for absorbing infrared radiation 8 emitted by the radiation source 10 and may be, for example, a material such as carbon black in powder form. In some embodiments, the radiation absorbent material is carbon black nano-particles, for example having a primary particle size of 15 nm or less and finely dispersed throughout the solvent.

The carbon nanotubes 16 are elongate particles, i.e. elongate elements. The carbon nanotubes 16 may have lengths that are at least ten times larger than the widths or diameters of the carbon nanotubes 16. The carbon nanotubes 16 typically have length-to-diameter ratio of up to 132,000,000:1. The carbon nanotubes 16 have substantially cylindrical nanostructure. The carbon nanotubes 16 may have, for example, a diameter of <1 nm up to 50 nm. The carbon nanotubes 16 may have lengths of several microns or longer, e.g. at least 10 µm. The carbon nanotubes may have diameters in the range 1-50 nm, and lengths in the range 10 to 500 nm. In some embodiments, one or more different types of elongate element is used instead of or in addition to the carbon nanotubes 16. Examples of appropriate other elongate elements include, but are not limited to, glass fibres, silicon carbide whiskers, and graphene fibres, graphene flakes, and graphene platelets.

In use, radiation 8 provided by the radiation source 10 is absorbed by the radiation absorbent material within the first compound 14 where it is present on the surface of the layer 6. This causes the radiation absorbent material to heat up. Heat from the radiation absorbent material is transferred (i.e. radiated) to the underlying particulate material raising the temperature of individual particles of the layer 6 of particulate material. The particles of the layer 6 are heated to at least their melting temperature and the particles coalesce. Thus, the particulate material onto which the first compound 14 is deposited is fully melted.

Also, in this embodiment, the heating up of the radiation absorbent material causes the solvent of the first compound 14 to evaporate, thereby leaving the radiation absorbent material and the carbon nanotubes 16 deposited on the layer 6. As the particulate material onto which the first compound 14 is deposited is fully melted, the radiation absorbent material and the carbon nanotubes 16 tend to diffuse into, and become embedded within, the melted particulate material.

The fully melted material is subsequently allowed to cool so as to form a layer of solid material with the radiation absorbent material and the carbon nanotubes 16 embedded therein. Thus, a coherent mass of combined particulate material, radiation absorbent material and the carbon nanotubes 16 is formed.

In this embodiment, no first compound 14 (and therefore no radiation absorbent material) is provided on the regions of surface portion of the layer 6 of the particulate material that are not to be consolidated. Where no radiation absorbent material is applied to the layer 6, the heating of the particulate material in those regions by the incident radiation 8 is not sufficient to cause melting of the particulate material. Thus, there is no combination of the particulate material in the regions to which no radiation absorbing material is applied when the layer 6 is exposed to the radiation 8.

After the material has been allowed to cool and solidify, a further layer of particulate material may be applied across the top surface of the layer 6. The above described process may then be repeated, i.e. a further layer of first compound 14 may be applied to the further layer of particulate material and radiation may be applied thereafter. In this way, many layers of material are laid on top of one another (in accordance with a digital design model for the object being produced which may be accessible by the controller 4) to produce the object. Further information about apparatus that may be used to perform this process is described in more detail later below with reference to FIG. 3.

The carbon nanotubes 16 embedded within the produced object tend to provide that the object has improved structural stiffness, for example, compared to objects produced without the carbon nanotubes 16. Also, the carbon nanotubes 16 embedded within the produced object tend to provide that the object has improved mechanical strength, for example, compared to objects produced using conventional processes. Also, the carbon nanotubes 16 embedded within the produced object tend to provide that the object has improved stability, for example, compared to objects produced using conventional processes.

The deposition of the first compound 14 directly onto the surface portion of the layer 6 advantageously enables the radiation absorptive properties of the particulate material to be varied and carefully controlled, as desired.

Also, the deposition of the first compound 14 directly onto the surface portion of the layer 6 advantageously enables the strengthening or stiffening properties of the carbon nanotubes 16 to be varied and carefully controlled, as desired. For example, in areas where a greater amount of first compound 14 applied, a greater amount of the carbon nanotubes 16 will tend to become embedded in the consolidated material. Thus, the resulting solidified layer will tend to have increased strength and/or stiffness properties in region where a greater amount of the first compound 14 was applied compared to regions where a lesser amount of the first compound 14 was applied.

In conventional processes, when the particulate material is combined by sintering at a slow rate (e.g. lower temperate), the produced object tends to have good material properties (e.g. relatively high strength) but relatively poor definition at the object edges. Also, in conventional processes, when the particulate material is combined by sintering at a rapid rate (e.g. higher temperate), the produced object tends to have inferior material properties (e.g. lower strength) but good edge definition. Use of the carbon nanotubes 16 within the first compound 14 advantageously tends to provide a solution to this problem encountered in conventional processes by providing increased strength, i.e. improved structural properties, even when rapid sintering is used. Thus, particulate material is combined by sintering at a rapid rate (e.g. higher temperate), thereby achieving good edge definition, whilst the carbon nanotubes 16 tend to provide the produced object with material properties that tend to be at least as good as those achieved if sintering at a slow rate (e.g. lower temperate) was performed.

Advantageously, when the first compound 14 is jetted onto to the surface of the layer, the carbon nanotubes 16 within the further compound tend to align. For example, carbon nanotubes within the first compound 14 tend to line up with one another when deposited onto the layer 6. This advantageously tends to further increase the mechanical strength of the produced object at least in the direction along which the carbon nanotubes are aligned.

In some embodiments, alignment of carbon nanotubes in a layer is improved, effected, or facilitated by exposing the deposited nanotubes to a force or field prior to the solidification of that layer. In some embodiment, the force or field is applied prior to the application of the radiation to the object (i.e. before melting of the particulate material). In some embodiments, the force or field is applied during the application of the radiation to the object (i.e. during melting of the particulate material). In some embodiments, the force or field is applied after the application of the radiation to the object (i.e. after melting of the particulate material, and before its solidification).

One example of a field that may be used to improve alignment of deposited carbon nanotubes is a magnetic field. A magnetic field may, for example, be applied across deposited carbon nanotubes prior to those nanotubes being embedded in a solid layer of the object being formed. A magnetic field may be applied by any appropriate device or system. Advantageously, a magnetic field may be applied to a deposited layer of carbon nanotubes remotely, for example there may be a significant distance between any part of an aligning magnet and the deposited carbon nanotubes.

A further example of a field that may be used to improve alignment of deposited carbon nanotubes is an electric field. Preferably, an AC electric field is used. Nevertheless, a DC electric field may be used, however carbon nanotubes may accumulate near an electrode applying the DC field. An electric field may be applied across deposited carbon nanotubes prior to those nanotubes being embedded in a solid layer of the object being formed. An electric field may be applied by any appropriate device or system.

In some embodiments, a different carbon nanotube alignment process may be performed instead of or in addition to the application of magnetic and/or electric field. For example, in some embodiments, acoustic waves may be applied through the deposited carbon nanotubes to improve alignment. In some embodiments, a standing or stationary wave is applied to improve alignment.

In some embodiments, a series of many layers of material are laid on top of one another to produce the object. In such embodiments, the carbon nanotubes in a layer of material may be oriented or aligned in a direction to the carbon nanotubes in one or more previous and/or subsequent layers of material. This may be performed as follows. Firstly, a first layer of material is formed including depositing carbon nanotubes, aligning those carbon nanotubes in a first direction (e.g. by applying a magnetic field along the first direction), and melting and subsequently solidifying the first layer of material. Secondly, a second, subsequent layer of material is formed on the first layer including depositing carbon nanotubes, aligning those carbon nanotubes in a second direction different to the first (e.g. by applying a magnetic field along the second direction), and melting and subsequently solidifying the second layer of material.

By orienting in different directions the carbon nanotubes in different layers, multi-directional improved material properties can be realised. Alternatively, improved material properties (e.g. tensile strength) in only a single direction can be realised.

As described in more detail later below with reference to FIG. 2, electrically conductive tracks or paths may be formed in the object. By orienting differently the carbon nanotubes in different layers as described in more detail above, the carbon nanotubes may be "steered" or directed along such paths or tracks. Thus, advantageously the carbon nanotubes may be aligned along meandering paths through the formed object, thereby providing improved electrical conductivity along such paths.

Figure 2:
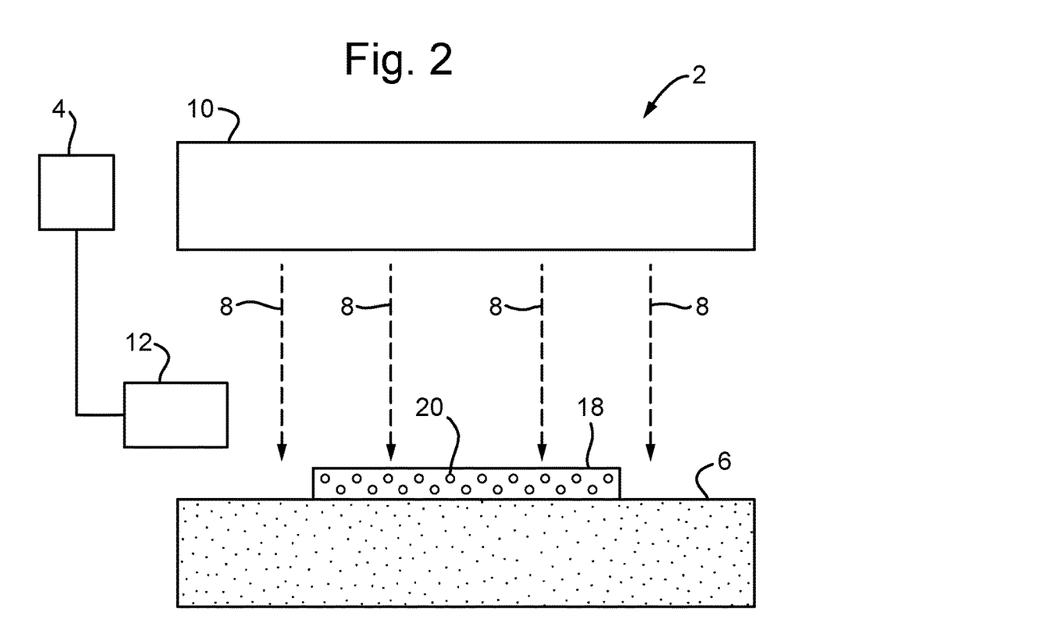
FIG. 2 is a schematic illustration (not to scale) of an apparatus for combining particulate material according to a further embodiment.

FIG. 2 is a schematic illustration (not to scale) showing a further example Additive Manufacturing apparatus according to a further embodiment in which corresponding elements have been given corresponding reference numerals.

In this further embodiment, the controller 4 controls the printing head 12 to deposit desired amounts of a second compound 18 onto the surface portion of the layer 6. The movement of the printing head 12 and the amount of the second compound 18 deposited by the printing head 12 is controlled by the controller 4.

In some embodiments, a temperature sensor or an infrared camera, or the like may be used to determine the surface temperature of the layer 6. The amount of the second compound 18 that is to be deposited onto the surface portion of the layer 6 may be determined by the controller 4 depending on the determined temperature.

In this embodiment, the second compound 18 is in liquid form and is jetted onto the surface of the layer 6 by the printing head 12.

In this embodiment, the second compound 18 comprises a solvent in which is dispersed a radiation absorbent material and a plurality of electrically conductive elements 20.

The solvent may be any appropriate solvent for example an aqueous medium that evaporates when exposed to the radiation 8 emitted from the radiation source 10.

The radiation absorbent material is for absorbing infrared radiation 8 emitted by the radiation source 10 and may be, for example, a material such as carbon black in powder form. In some embodiments, the radiation absorbent material is carbon black nano-particles, for example having a primary particle size of 15 nm or less and finely dispersed throughout the solvent.

The electrically conductive elements 20 are provided by electrically conductive particulate material that is distributed throughout the solvent. The electrically conductive elements 20 may be nano-particles and may, for example, have sizes within the range <1 nm up to 150 nm. The electrically conductive elements 20 may be metal, such as copper, or any other electrically conductive material. Preferably, the electrically conductive elements 20 are carbon nanotubes. However, in some embodiments, the electrically conductive elements 20 are not carbon nanotubes. Carbon nanotubes may have, for example, a diameter of <1 nm up to 50 nm. Carbon nanotubes may have lengths are several microns or longer, e.g. at least 10 µm. Carbon nanotubes may have diameters in the range 1-50 nm, and lengths in the range 10 to 500 nm. Advantageously, carbon nanotubes tend to have good electrical conductivity and tend to align and connect together when deposited and/or when sintering occurs so as to form an electrically conductive path.

In this embodiment, the electrically conductive elements are also thermally conductive elements.

Similarly to as described above, in use, radiation 8 provided by the radiation source 10 is absorbed by the radiation absorbent material within the second compound 18 where it is present on the surface of the layer 6. This causes the radiation absorbent material to heat up. Heat from the radiation absorbent material is transferred (i.e. radiated) to the underlying particulate material raising the temperature of individual particles of the layer 6 of particulate material. The particles of the layer 6 are heated to at least their melting temperature and the particles coalesce. Thus, the particulate material onto which the second compound 18 is deposited is fully melted.

Also, in this embodiment, the heating up of the radiation absorbent material causes the solvent of the second compound 18 to evaporate, thereby leaving the radiation absorbent material and the electrically conductive elements 20 deposited on the layer 6. As the particulate material onto which the second compound 18 is deposited is fully melted, the radiation absorbent material and the electrically conductive elements 20 tend to diffuse into, and become embedded within, the melted particulate material.

The fully melted material is subsequently allowed to cool so as to form a layer of solid material with the radiation absorbent material and the electrically conductive elements 20 embedded therein. Thus, a coherent mass of combined particulate material, radiation absorbent material and the electrically conductive elements 20 is formed.

In this embodiment, no second compound 18 (and therefore no radiation absorbent material) is provided on the regions of surface portion of the layer 6 of the particulate material that are not to be consolidated. Where no radiation absorbent material is applied to the layer 6, the heating of the particulate material in those regions by the incident radiation 8 is not sufficient to cause melting of the particulate material. Thus, there is no combination of the particulate material in the regions to which no radiation absorbing material is applied when the layer 6 is exposed to the radiation 8.

After the material has been allowed to cool and solidify, a further layer of particulate material may be applied across the top surface of the layer 6. The above described process may then be repeated, i.e. a further layer of second compound 18 may be applied to the further layer of particulate material and radiation may be applied thereafter. In this way, many layers of material are laid on top of one another (in accordance with a digital design model for the object being produced which may be accessible by the controller 4) to produce the object. Further information about apparatus that may be used to perform this process is described in more detail later below with reference to FIG. 3.

The electrically conductive elements 20 embedded within the produced object advantageously tend to provide that at least a portion of the object is electrically conductive. For example, a sufficient amount of the further compound 18 may be applied to the surface of the layer 6 such that, when sintered and solidified, there is a sufficient amount of electrically conductive elements 20 embedded in the solidified material to provide that that material is electrically conductive. Also for example, the proportion of the further compound 18 that is made up of the electrically conductive elements 20 is sufficient to provide that, when sintered and solidified, there is a sufficient amount of electrically conductive elements 20 embedded in the solidified material to provide that that material is electrically conductive. Preferably, the electrically conductive elements are embedded with the consolidated material such that they are in contact with one another, i.e. such that they are electrically connected. This may be facilitated by using a sufficient amount of the further compound 18 and/or having a sufficient proportion of the further compound 18 be the electrically conductive elements 20. Also, this may be facilitated by having the electrically conductive elements 20 be carbon nanotubes that tend to link together so as to be electrically connected together when deposited or during sintering.

The deposition of the second compound 18 directly onto the surface portion of the layer 6 advantageously enables the electrically conductive properties of the electrically conductive elements 20 to be varied and carefully controlled across the surface portion of the layer 6, as desired. In some embodiments, the second compound 18 is applied to the surface of the layer 6 so as to define one or more electrically conductive paths or tracks across the surface.

For example, one or more electrically conductive tracks that connect together two different points on the surface of the layer 6 may be defined.

In some embodiments, one or more devices may be attached to or embedded in the object at a point along an electrically conductive track formed in the object. For example, in some embodiments, an input port or connector is embedded into the object at one end of an electrically conductive track. In some embodiments, an output port or connector may be embedded into the object at one end of an electrically conductive track, e.g. an opposite end to the end at which the input port is located. In some embodiments, an electrical component (for example a resistor, a capacitor, a diode, a switch, etc.) may be embedded in the object along an electrically conductive track formed therein.

In embodiments in which the electrically conductive elements are elongate, e.g. carbon nanotubes or elongate graphene platelets, the elements may be aligned along the electrically conductive tracks, for example, movement of the printing head, and/or by using magnetic or electric fields as described in more detail above.

In some regions of the surface (e.g. in regions other than the defined electrically conductive tracks) a compound that does not contain the electrically conductive elements 20, for example a compound that contains only the radiation absorbent material and the solvent, or a compound that contains electrically insulating material, the radiation absorbent material and the solvent, may be applied. Thus, when radiation is applied to the surface and the particulate material is sintered, one or more electrically conductive tracks or paths are formed, which may be surrounded (at least to some extent) with non-electrically conductive material or electrically insulating material. In this way, electrically insulating "jackets" may be formed in the object around an electrically conductive track.

In some embodiments, by applying compounds with different concentrations (i.e. loading levels) of the electrically conductive elements 20, the electrical properties across the thickness or surface layer of the deposition layer may be changed to create a functionally graded material. Thus, an object having different electrical (and/or material) properties at different positions of the material may be formed. Using such a technique, the electromagnetic absorption characteristics of the formed object may be optimised with respect to one or more predetermined criteria.

In some embodiments, the second compound 18 is applied to the surface of the layer 6 so that it overlaps at least to some extent with an electrically conductive path formed in the prior sintered layer. The layer 6 may be subsequently sintered thereby forming an electrically conductive track between the current layer and the prior layer. In this way, an electrically conductive track that extends through multiple layers of the produced object may be formed.

Using the above described process, a three dimensional object having one or more three dimensional electrically conductive tracks, or three dimensional network of electrically conductive tracks, embedded therein may be formed.

Figure 3:
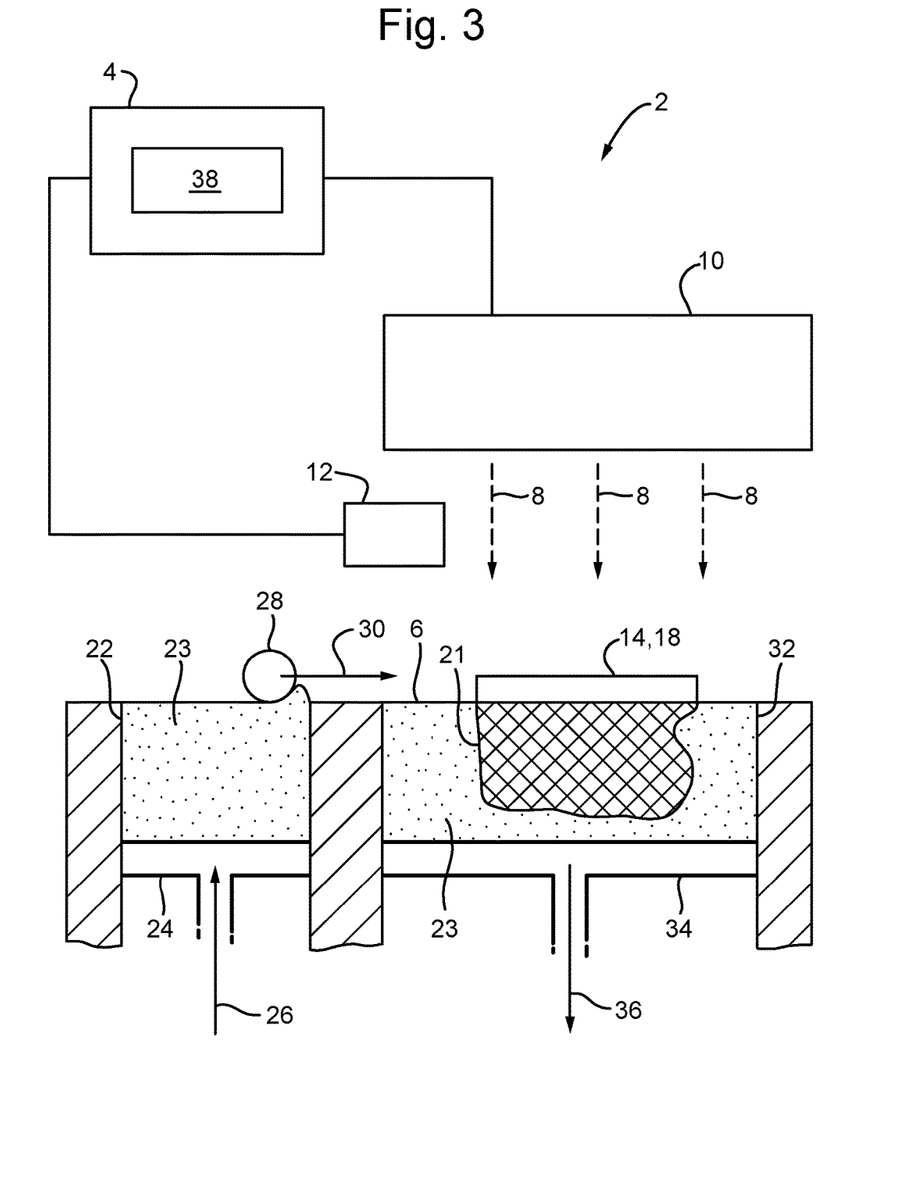
FIG. 3 is a schematic illustration (not to scale) of an apparatus for combining particulate material being used to form a three dimensional object.

FIG. 3 is a schematic illustration (not to scale) showing example apparatus that may be used to form a three dimensional object 21 using the processes described above with reference to FIGS. 1 and 2. Elements of the apparatus which have been referred to above have been given corresponding reference numerals. Although a piston-based AM apparatus is implemented here, it will be appreciated by the skilled person that a different AM apparatus, for example a conveyor based AM apparatus, may be used.

The apparatus 2 comprises a first powder repository 22 (or powder bed) containing an amount of the particulate material 23.

In operation, a first piston 24 (that is located at the bottom of the first repository 22) is raised (in the direction indicated by an arrow in FIG. 3 and the reference numeral 26) so as to raise an amount of the particulate material 23 above a top level of the first repository 22. A roller 28 is then rolled (in the direction indicated by an arrow in FIG. 3 and the reference numeral 30) over the upper surface of the first repository 22 and across an upper surface of a second repository 32. This is performed so that the particulate material 23 that was raised above the level of the first repository 22 by the raising of the first piston 24 is spread over an upper surface of the second repository 32. Thus, a top surface of the contents of the second repository 32 is covered by a layer 6 of the particulate material 23. In other embodiments, a different means of spreading the particulate material 23 across a top surface of the contents of the second repository 32, such as a wiper, may be used instead of or in addition to the roller 28.

After a layer 6 of the particulate material 23 has been spread across a top surface of the contents of the second repository 32, the printing head 12 is controlled by the controller 4 to deposit a layer of a compound containing a radiation absorbing material (e.g. a layer of the first compound 14 and/or a layer of the second compound 18) on the top surface of the layer 6.

After deposition of the compound 14, 18, the controller 4 controls the radiation source 10 to emit radiation 8 onto the top surface of the contents of the second repository 32, thereby sintering a portion of the layer 6 of the particulate material 23 as described in more detail earlier above.

In this embodiment, the particulate material 23 over which the compound has been applied is fully melted by the radiation and subsequently allowed to cool so as to form a layer of solid material. A second piston 34, located at the bottom of the second repository 22 is then lowered (i.e. moved in a direction indicated in FIG. 3 by a solid arrow and the reference numeral 36) to allow for a further layer of the particulate material 23 to be spread by the roller 18 across the top surface of the contents of the second repository 22 (and subsequently melted and allowed to solidify).

Many layers of material are laid on top of one another and sintered together, in accordance with a digital design model 38 for the object 21, to produce the object 21.

In the above embodiments, a compound is in liquid form and is jetted onto the surface of the layer of particulate material by the printing head. However, in other embodiments, a compound is in a different form, for example, solid (e.g. in powder form) or gas. Also, in other embodiments, a compound may be deposited in a different appropriate way.

In the above embodiments, a compound deposited on the surface of the layer of particulate material contains a radiation absorbent material and either carbon nanotubes or a different electrically (and/or thermally) conductive material or elements. In other embodiments, the compound deposited may include both the carbon nanotubes and the different electrically conductive elements or material. In some embodiments, the different electrically conductive elements or material are not used.

In some embodiments, elongate graphene plates or platelets (or elongate graphene flakes) are used instead of or in addition to carbon nanotubes. The jetting or ejection of the elongate graphene platelets as the printing head moves across the surface of the parts being formed tends to align cause the elongate graphene plates. Advantageously, elongate graphene plates tends to provide the same or similar advantages as carbon nanotubes.

In the above embodiments, a compound deposited on the surface of the layer of particulate material contains a radiation absorbent material and one or more separate, different additional materials (such as the carbon nanotubes and/or the different electrically conductive elements). However, in other embodiments, the carbon nanotubes provide both the above described radiation absorbing property and the above described strengthening property. Also, in other embodiments, the different electrically conductive elements may be made of a radiation absorbent material such that the electrically conductive elements provide both the above described radiation absorbing property and the above described electrically and/or thermally conductive property.

In the above embodiments, the radiation absorbent material and the additional material(s), i.e. the carbon nanotubes and/or the different electrically conductive elements, are deposited together as a compound material. In particular, the radiation absorbent material and the additional material(s) are dispersed throughout a common solvent. However, in other embodiments, the radiation absorbent material and one or more of the additional material may be deposited on the surface of the layer of particulate material separately, e.g. by different printing heads or by a common printing head.

In the above embodiments, the carbon nanotubes and/or the different electrically conductive elements are only applied to the portion of the surface of the layer of particulate material that is to be sintered to form the object. This advantageously tends to avoid wastage of carbon nanotubes and/or the different electrically conductive elements, i.e. the fibres and/or the electrically conductive elements are only deposited where desired. This is in contrast to, for example, providing carbon nanotubes and/or the different electrically/ thermally conductive elements in the particulate material itself.

The invention claimed is:

1. A method of forming a three dimensional object, the method comprising:
 iteratively performing steps (i) to (iv) so as to form a three dimensional object comprising an electrically conductive track through at least part of the object, the electrically conductive track being defined by electrically conductive elements embedded within the object, wherein:
 step (i) comprises providing a layer of particulate material;
 step (ii) comprises providing an amount of a radiation absorbent material over a selected surface portion of the layer of particulate material;
 step (iii) comprises providing an amount of a material that comprises a plurality of electrically conductive elements over only part of the selected surface portion of the layer of particulate material; and
 step (iv) comprises providing radiation across the selected surface portion of the layer of particulate material so as to sinter a portion of the particulate material of the layer including causing the plurality of electrically conductive elements to become embedded in the portion of material and to sinter the portion of material with a previously sintered portion of the material in a prior layer; wherein
 the step of providing an amount of a material that comprises a plurality of electrically conductive elements comprises:
 providing a first non-zero level of the material that comprises a plurality of electrically conductive elements on a first area of the selected surface portion of the layer of particulate material; and
 providing a second non-zero level of the material that comprises a plurality of electrically conductive elements on a second area of the selected surface portion of the layer of particulate material, the second level being different to the first level.

2. The method according to claim 1, wherein the electrically conductive elements are elongate elements selected from the group of elements consisting of carbon nanotubes and elongate graphene plates.

3. The method according to claim 1, wherein
 the electrically conductive elements are elongate elements; and
 providing the electrically conductive elements over only part of the selected surface portion of the layer of particulate material comprises ejecting, from a printing device, the electrically conductive elements as the printing device moves over the selected surface portion of the layer of particulate material, thereby aligning the electrically conductive elements in a direction of travel of the printing device.

4. The method according to claim 1, wherein
 the electrically conductive elements are elongate elements; and the method further comprises, in at least one iteration of steps (i) to (iv), after or during step (iii), applying a force or field to the deposited electrically conductive elements, thereby causing the deposited electrically conductive elements to substantially align.

5. The method according to claim 4, wherein applying a force or field comprises:
generating an electric field or a magnetic field; and
exposing deposited carbon nanotubes to the generated electric or magnetic field.

6. The method according to claim 1, wherein the electrically conductive elements in a first layer are aligned in a different direction to the electrically conductive elements in a second layer, the first layer being different to the second layer.

7. The method according to claim 1, wherein the radiation absorbent material and the electrically conductive elements are the same material.

8. The method according to claim 1, wherein the method further comprises, prior to providing radiation across the selected surface portion of the layer of particulate material, providing an amount of a material that comprises a plurality of elongate elements over at least part of the selected surface portion of the layer of particulate material; and
sintering the portion of the material of the layer causes the plurality of elongate elements to become embedded in the sintered portion of material.

9. The method according to claim 1, wherein, in at least one iteration of steps (i) to (iv), step (iii) is performed such that:
the material that comprises the electrically conductive elements is applied over a part of the prior layer in which electrically conductive elements are embedded such that, after sintering, an electrically conductive path between a current layer and the prior layer is provided; and
the material that comprises the electrically conductive elements is applied over only part of the selected surface portion of the layer of particulate material so that, after sintering, an electrically conductive track between one point within a sintered layer and a different point within the sintered layer is provided.

* * * * *